United States Patent

[11] 3,619,761

[72] Inventors Masaomi Nagae;
Sumio Yokokawa, both of Kawasaki, Japan
[21] Appl. No. 18,102
[22] Filed Mar. 10, 1970
[45] Patented Nov. 9, 1971
[73] Assignee Fuji Denki Seizo Kabushiki Kaisha
Kawasaki-shi, Japan
[32] Priority Mar. 13, 1969
[33] Japan
[31] 44/18986

[54] EXCITATION CONTROL DEVICE OF SELF-EXCITING, COMPOUND SYNCHRONOUS MACHINE
9 Claims, 5 Drawing Figs.

[52] U.S. Cl. ................................................ 322/25, 322/27, 322/28, 322/60
[51] Int. Cl. ............................................... H02p 9/30, H02p 9/10
[50] Field of Search ................................. 322/25, 27, 28, 36, 60, 73

[56] References Cited
UNITED STATES PATENTS
3,378,753 4/1968 Poppinger et al. .............. 322/28
3,496,448 2/1970 Eidenvall et al. ............... 322/28

*Primary Examiner*—Oris L. Rader
*Assistant Examiner*—H. Huberfeld
*Attorney*—Holman, Glascock, Downing & Seebold ABSTRACT: An excitation control device of a self-exciting, compound synchronous machine, particularly a synchronous generator, excited by way of a rectifying device including at least one thyristor, which device includes a stable ignition signal source for the thyristor of the rectifying device and is capable of supplying an exciting current even when a short circuit failure occurs in a system connected to the synchronous machine. By this device, a generator can continue to supply a short circuit current, whereby the operation of an overcurrent relay and resynchronization with the system without undue conditions at the time of recovery from the failure are assured.

INVENTORS
M. NAGAE
S. YOKOKAWA

BY Holman, Glascock, Downing & Seebold
ATTORNEYS

EXCITATION CONTROL DEVICE OF SELF-EXCITING, COMPOUND SYNCHRONOUS MACHINE

BACKGROUND OF THE INVENTION

This invention relates generally to self-exciting, compound synchronous machines and to control of the exciting current thereof.

More particularly, the invention relates to a new excitation control device of self-exciting, compound synchronous machines, whereby a combined voltage of a no-load component and a load component is supplied through at least one thyrister to a field winding of a synchronous machine or an exciter accessory thereto, and the exciting current flowing through the field winding is controlled by control of conduction of the thyristor or thyristors.

In general, as methods of combining a no-load component and a load component, there are three modes of voltage combining, current combining, and electromagnetic combining.

In voltage combining, the terminal voltage of a synchronous machine or a voltage proportional thereto is taken as the no-load component, while a voltage proportional to the load current of the synchronous machine is obtained by means such as a current transformer with reactor or with airgap as the load component, and these two voltages are combined.

In current combining, from the terminal voltage or a voltage proportional thereto, a current proportional to this voltage is obtained through a reactor as the no-load component, while the load current or a current proportional thereto is taken as the load component, and these two currents are combined.

In electromagnetic combining, a voltage or current to constitute the no-load component or the load component is introduced into two of the three windings of a three-winding transformer or current transformer, and a combined voltage or current is obtained from the remaining third winding and applied to the field winding. In some cases, a three-leg core with airgap is provided with a voltage winding, a current winding, and an output winding, and a combined voltage is derived from the output winding.

The fundamental thinking in combining these no-load and load components for use as an excitation quantity for a synchronous machine intends to maintain the terminal voltage at a constant value without any control devices. In actual practice, however, since a difference exists in the values of the direct-axis impedance and the guadrature-axis impedance, the impedance drop is not proportional to the current value at the different power factors.

Accordingly, since a load current component of the above stated character does not fully compensate for the impedance drop of the synchronous machine, it is a common practice for obtaining constant-voltage characteristics of high accuracy to detect the output voltage of the synchronous machine separately and to accomplish fine control of the excitation quantity thus obtained. For this purpose, a control element or component such as a saturable reactor, power transistor, or thyristor is used.

In the case of voltage combining, the above-mentioned control element is connected in series with the field winding to function as a series-connected variable resistance or a variable impedance with respect to the field winding. In the case of current combining, the control element is connected in parallel with the field winding, and a portion of the combined current is shunted through the control element, whereby a specific exciting current flows through the field winding. In the case of electromagnetic combining, either the above-mentioned series-connected impedance control or shunt control is selected depending on the form of the electrical quantity, and, depending on the circumstances, controlling by providing a DC control winding on a core of a three-winding transformer used as a saturable core can also be considered.

Exciting current control by means of a control element in the above-described manner can be used not only for control of a terminal voltage at a constant value but also for reactive power control and power-factor control.

In a synchronous machine, particularly in a synchronous generator, when a short circuit occurs in the system bus, it is necessary to operate the appropriate circuit breakers by means such as a current relay for the duration of the short-circuit failure to separate the generator or to isolate and remove the short-circuited part of the system. For this reason, it is necessary to provide means whereby, even when a short-circuit failure occurs, the generator does not immediately become deenergized, a short-circuit current for activating the current relay can be supplied, and an exciting current for synchronization with respect to the system voltage upon recovery from the failure is assured.

On one hand, a device such as a voltage regulator, a reactive power regulator, or ignition device used for thyristor control is used for controlling the control element connected in series or parallel with the field winding, and this device derives its operating power ordinarily from the generator terminals. Consequently, in the case of a short-circuit failure as described above, the power supply of this device is lost, and control of the control element becomes impossible.

In a self-excited, compound synchronous machine of current-combining type, even when the control element assumes a noncontrolled state, the only consequence is that shunt control is not carried out, and the flow through the field winding of a current corresponding at least to the load current which is a load component is continued, whereby a short-circuit current of a value determined by conditions such as the no-load saturation curve of the synchronous machine and the short-circuit impedance can be caused to flow.

However, in a self-excited, compound synchronous machine of voltage combining type in which the control element is connected in series with the field winding, in many cases when the control element becomes noncontrolling, the control element interrupts the exciting current, and it becomes impossible to cause a short-circuit current for the above-mentioned purpose to flow. In this case, the desired current relay operation is not carried out, and at the time of recovery of the system voltage, moreover, it is necessary to wait for an increase in the exciting current due to the self-excitation phenomenon and to resort to forced paralleling.

SUMMARY OF THE INVENTION

It is an object of the present invention to overcome the above-described difficulties and to provide an excitation control device whereby, in a self-excited, compound synchronous machine of voltage-combining type of the above-described character, the control of the control element can be continued through simple members at the time of a short-circuit failure thereby to cause the necessary short circuit current to flow and thereby to assure synchronization of the generator to the power system at the time of recovery of the system voltage after a short-circuit failure.

The nature, principle, and utility of the invention will be more clearly apparent from the following detailed description beginning with general considerations and concluding with specific examples of preferred embodiment of the invention, reference being made to the accompanying drawings, in which like parts and quantities are designated by like reference numerals and characters.

DETAILED DESCRIPTION

Figure 1:
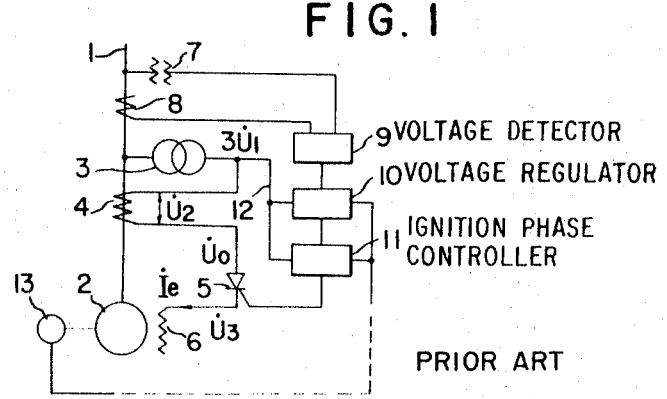
FIG. 1 is a circuit diagram, partly in a simplified block form, of an excitation control device of known type for a self-exciting, compound synchronous machine.

According to the present invention there is provided an excitation control device of the aforestated character comprising: first means for extracting a first voltage corresponding to the terminal voltage of the synchronous machine; second means for extracting a second voltage corresponding to the load current of the synchronous machine, third means for obtaining a combined voltage which is the vector sum of the first and second voltages; a rectifying device for rectifying the combined voltage and supplying a direct-current exciting current to the field winding; at least one control element connected to the output side of the third means and in series with the field winding and disposed in a built-in state within the rectifying device or separately therefrom; a controlled quantity detector for detecting the terminal voltage, the reactive power, or the power factor of the synchronous machine and producing as output an electrical quantity corresponding thereto; a regulator for producing as output a first signal for controlling the control element in accordance with the electrical quantity; at least one signal generator comprising a capacitor charged through a resistance by said second voltage and a constant-voltage element connected through a diode in parallel with said capacitor, said constant-voltage element producing from the terminals thereof a second signal for rendering the control element substantially fully conductive; and a short-circuit detecting device for detecting any short circuit in a short-circuit connected to the synchronous machine and applying the second signal to the control element.

According to the present invention, furthermore, the second voltage or combined voltage introduced as input into the signal generator is derived from a simulation circuit of the first and second means. Accordingly, there is no distortion in the waveform of the voltage introduced as input into the signal generator, which voltage is thereby advantageous for use as a control signal for the control element.

Thus, by the practice of the present invention, when the original adjuster becomes nonoperative at the time of a short-circuit failure, the second voltage which is generated by the short-circuit current or a combined voltage containing this second voltage is used as an input of the signal generator, in which case, these voltages are used as a power source for generation of the second signal. Therefore, when the terminal voltage of the synchronous machine drops greatly or even when it becomes zero, conduction through the control element can be positively accomplished, whereby at least a second voltage corresponding to the load current is impressed on the field winding, and it is possible to apply an exciting current for maintaining the necessary short-circuit current.

As conducive to a full understanding of the nature and utility of the present invention, an example of an excitation control device of known type for a self-exciting, compound synchronous machine will now be considered.

As indicated in FIG. 1, this excitation control device is applied to control the excitation of a synchronous machine 2 as, for example, a synchronous generator, having a field winding 6 and connected to a system bus 1 and has the following organization.

A transformer 3 is connected on the primary side thereof to the bus 1 to extract a voltage proportional to the terminal voltage as the no-load component, and a current transformer 4 with airgap connected in series with the transformer 3 is coupled to the bus 1 for extracting a voltage proportional to the load current of the synchronous machine as the load component. A thyristor 5 is provided for rectifying a combined voltage obtained by the series connection of the respective secondary windings of the transformer 2 and current transformer 4 and, moreover, for producing in accordance with a gate signal thereof a variable DC exciting voltage as output.

Figure 3:
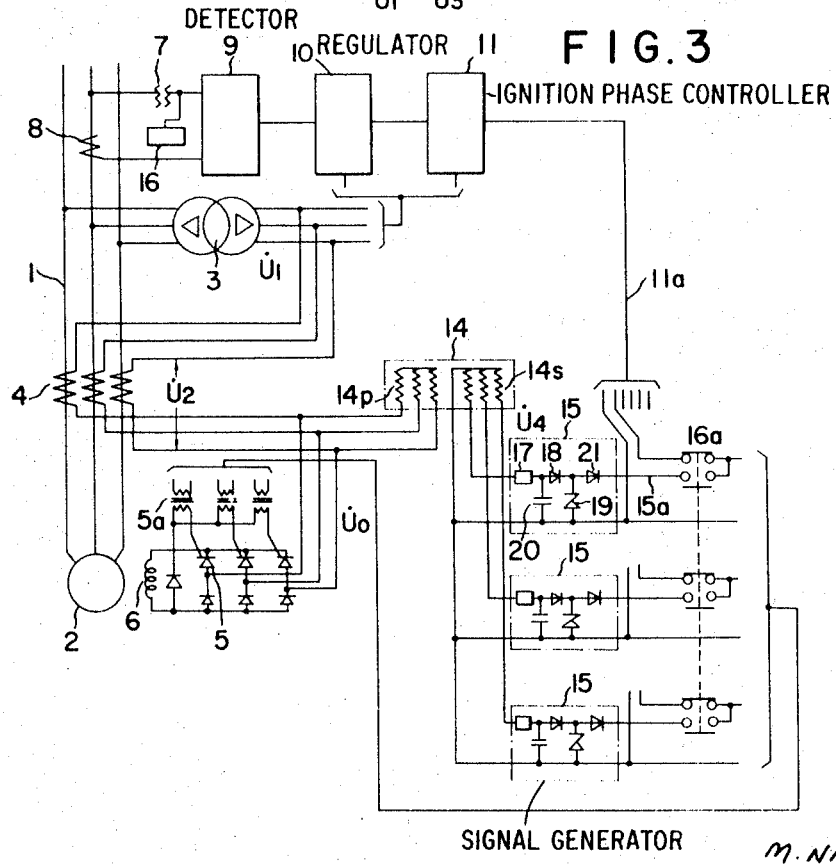
FIG. 3 is a circuit diagram, partly in block form, indicating the essential organization of one example of a device embodying the invention.

A transformer 7 for instruments connected to the bus 1 for measuring the terminal voltage and a current transformer 8 for instruments coupled to the bus 1 for measuring the load current are connected on their secondary sides to the input side of detector 9 to introduce thereinto the terminal voltage and the load current. The detector 9 is a voltage detector including a compensator such as shown in FIG. 3 of literature "Underexcited Voltage Regulator," AIEE, Transactions, Vol. 73, Part III, Dec. 1954pp. 1,433–1,438. In this case, the voltage detector 9 is adjusted so as to control normal reactive current instead of controlling the underexcited reactive current. In the detector 9, the terminal voltage is compared with a preset reference voltage and becomes a voltage deviation signal, or the voltage and current are combined and converted into an electrical quantity proportional to the reactive power or the power factor, which electrical quantity is similarly compared with a set value to produce a specific deviation signal as output.

Figure 4:
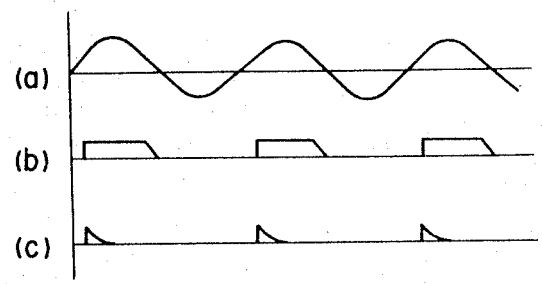
FIG. 4 is a graphical time chart indicating ignition signals in the device shown in FIG. 3.

The deviation signal thus produced is received by a regulator 10 as, for example, an automatic voltage regulator, which may be a conventional DC amplifier adapted to amplify the deviation signal. An ignition phase controller 11 is provided to produce as output the aforementioned gate signal of the thyristor 5. This controller 11 consists of three groups of pulse oscillator such as shown in FIG. 4. 21(B) on page 61 of the literature "Silicon Control Rectifier Manual, Third Editon," General Electric Co., Auburn, New York, 1964. In the controller 11, a PNP transistor controlled by means of output signal of the regulator 10 is used in the place of the variable resistance in said literature. The regulator 10 and controller 11 are supplied with power from the secondary winding of the transformer 3 through a power supply line 12.

When, in an excitation control device of the above-described organization, a short circuit occurs in the system bus 1, the voltage thereof drops to zero or a value of an order whereby regulator 10 and controller 11 cannot operate, and a gate signal is no longer applied to thyristor 5. In an excitation control device of this voltage-combining type, the nonconductive state of thyristor 5, which is the control element, interrupts the exciting current to field winding 6 since in this case thyristor 5 is connected in series with field winding 6.

Heretofore, there has been a control device in which, in order to prevent loss of the operating power source of controller 10 and other components at the time of a short circuit of this nature, synchronous machine 2 is provided with a generator 13 of permanent magnet type, and the voltage thus generated thereby is supplied to controller 10 and other components. By this arrangement, even when the voltage of the system bus is lost, at least the output of generator 13 remains unimpaired and can be supplied to the necessary equipment.

Figure 2:
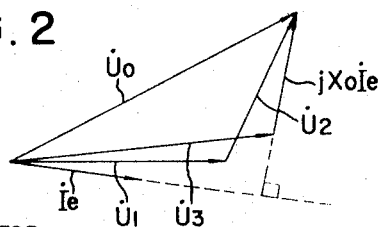
FIG. 2 is a vector diagram for a description of the operation of the device indicated in FIG. 1.

Control of the exciting current by means of a series-connected control element with respect to a self-exciting, compound synchronous machine of voltage-combining type, as in the above-described example, will now be described through the use of the vector diagram shown in FIG. 2. Vector U1 represents a voltage proportional to the terminal voltage, U2 represents a voltage proportional to the load current, and U0, the resultant vector sum, is the combined voltage of voltages U1 and U2.

While a series-connected control element ordinarily can be considered to a variable resistance, a thyristor of ignition phase controlled character as used in the device illustrated in FIG. 1 can be considered to be equivalent to a variable impedance. Then, when voltage U3 obtained on the output side of the control element is taken as a voltage converted to the AC side, and the impedance of the transformer 3 and current transformer 4 with airgap as used in the device shown in FIG. 1, which is principally a reactance, is represented by XO, the combined voltage U0 is equal to the vector sum of voltage U3 and reactance drop $jX_0 I_e$, where $I_e$ is the exciting current determined by the ignition phase of the control element and is of a value converted to the AC side.

Then, when the value of the variable impedance of the control element is ($R2+jX2$), and at the same time, the impedance converted to the AC side of the field winding is ($R1+jX1$), the exciting current Ie becomes $$Ie = \frac{U1+U2}{R1+j(X0+X1)+(R2+jX2)}$$

Resistance $R2$ increases with a decrease in the conduction band of the control element, while $X2$ increases with a delay in the conduction angle. Then, when the control element becomes nonconductive, both the resistance $R2$ and the reactance $X2$ are considered to have become infinity. On the other hand, when the control element becomes fully conductive, the maximum value of the exciting current is attained. Thus, it is possible by means of this control element to control the exciting current from zero to this maximum value.

When a short-circuit malfunctioning occurs, for example, even when the bus voltage becomes zero, and voltage $U1$ is lost, an exciting current can be caused to flow as long as the control element is maintained in its conductive state since the voltage $U2$ due to the short-circuit current still remains.

For this purpose, a transformer 14 for extracting the combined voltage $U0$ is provided in one embodiment of the invention as illustrated in FIG. 3, and the phase voltage output $U4$ of the secondary winding 14s thereof is used as the input voltage of signal generators 15. Each signal generator 15 comprises a resistance 17, a capacitor 20, diodes 18 and 21, and a Zener diode 19 and produces as output a voltage of half-wave rectangular waveform as indicated in FIG. 4(b) by the action of diode 21 and Zener diode 19.

A voltage relay 16 connected to the secondary side of a transformer 7 for instruments operates when the bus voltage drops below a certain value to switch over the contact points 16a thereof. More specifically, connection is switched from the output line 11a of an ignition phase controller 11 to the output line 15a of each signal generator 15, and the rectangular waveform voltage thereof is introduced into each of pulse transformers 5a belonging to a thyristor 5. From the secondary side of each pulse transformer 5a, an ignition pulse as indicated in FIG. 5(c) is produced as output and applied to the gate electrode of the corresponding thyristor 5.

Figure 5:
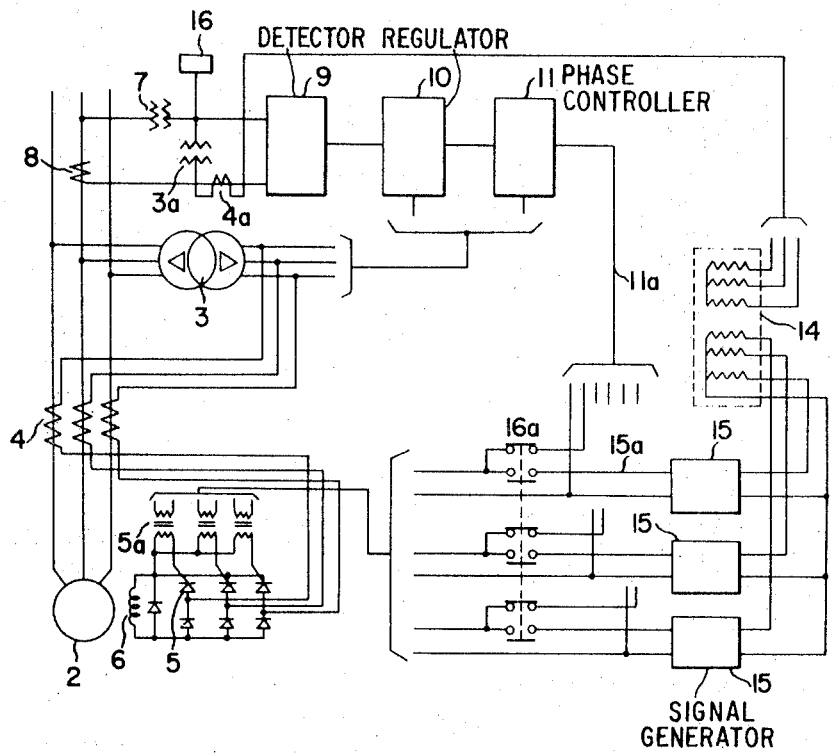
FIG. 5 is a circuit diagram, partly in block form, indicating the essential organization of another example of a device according to the invention.

In another embodiment of the invention as illustrated in FIG. 5, the operational power source supply connected to the input in the of signal generators 15, differing from that in the example shown in FIG. 3, is obtained by a simulation circuit comprising a transformer 3a for instruments and a current transformer 4a with air gap for instruments. In this case, since a rectifying device is not provided in the simulation circuit, there is no waveform distortion in the combined voltage thus obtained, and ignition pulses, with the desired phase can be constantly obtained.

Thus, in an excitation control device according to the invention as described above, a series-connected control element is maintained in the conductive state even at the time of short circuit, whereby a desired short-circuit current is sustained, and the operation of a current relay for selective interruption and synchronization at the time of recovery of the system are assured. A particularly advantageous feature of the invention is that a strong auxiliary power supply is not necessary, a simple member being practically usable.

An advantageous feature of the example illustrated in FIG. 3 is that, since the combined voltage Uo is introduced into the signal generators 15, ignition pulses of a phase corresponding to the phase of the combined voltage Uo introduced as input into the thyristor 5 are generated irrespective of the magnitude of the voltage $U1$. In some cases, however, it is also possible to introduce only the voltage $U2$ proportional to the load current into the signal generators 15 to accomplish substantially the same operation.

What we claim is:

1. An excitation control device of a self-exciting, compound synchronous machine having a field winding, said device comprising, in combination:

first means for extracting a first voltage corresponding to the terminal voltage of the synchronous machine;

second means for extracting a second voltage corresponding to the load current of the machine;

third means for obtaining the combined voltage of said first and second voltages; a rectifying device for rectifying said combined voltage and supplying a direct-current exciting current to said field winding;

at least one control element connected to the output side of said third means and in series with the field winding;

a controlled quantity detector for detecting a variable characteristic of the synchronous machine and producing as output an electrical quantity corresponding thereto;

a regulator for producing as output a first signal for controlling the control element in accordance with said electrical quantity;

at least one signal generator comprising a capacitor charged through a resistance by said second voltage and a constant-voltage element connected through a diode in parallel with said capacitor, said constant-voltage element producing from terminals thereof a second signal for rendering the control element substantially fully conductive; and a short-circuit-detecting device for detecting any short circuit in a system connected to the synchronous machine and applying said second signal to the control element.

2. An excitation control device of a self-exciting, compound synchronous machine having a field winding, said device comprising, in combination:

first means for extracting a first voltage corresponding to the terminal voltage of the synchronous machine;

second means for extracting a second voltage corresponding to the load current of the machine;

third means for obtaining the combined voltage of said first and second voltages;

a rectifying device for rectifying said combined voltage and supplying a direct-current exciting current to said field winding;

at least one control element connected to the output side of said third means and in series with the field winding;

a controlled quantity detector for detecting a variable characteristic of the synchronous machine and producing as output an electrical quantity corresponding thereto;

a regulator for producing as output a first signal for controlling the control element in accordance with said electrical quantity;

at least one signal generator comprising a capacitor charged through a resistance by said second voltage and a constant-voltage element connected through a diode in parallel with said capacitor, said constant-voltage element producing from terminals thereof a second signal for rendering the control element substantially fully conductive; and a short-circuit-detecting device for detecting any short circuit in a system connected to the synchronous machine and applying said second signal to the control element.

3. An excitation control device as claimed in claim 1 in which said second voltage introduced as input into the signal generator is derived from a simulation circuit of said first and second means.

4. An excitation control device as claimed in claim 2 in which said combined voltage introduced as input into the signal generator is derived from a simulation circuit of said first and second means.

5. An excitation control device as claimed in claim 1 in which said variable characteristic to be detected by said controlled quantity detector is the terminal voltage of the synchronous machine.

6. An excitation control device as claimed in claim 1 in which said variable characteristic to be detected by said controlled quantity detector is the reactive power of the synchronous machine.

7. An excitation control device as claimed in claim 1 in which said variable characteristic to be detected by said controlled quantity detector is the power factor of the synchronous machine.

8. An excitation control device as claimed in claim 1 in which said at least one control element is a thyristor.

9. An excitation control device as claimed in claim 2 in which said at least one control element is a thyristor.

* * * * *